United States Patent
Krivenok et al.

(10) Patent No.: US 10,397,087 B1
(45) Date of Patent: Aug. 27, 2019

(54) STATUS MONITORING SYSTEM AND METHOD

(71) Applicant: EMC IP Holding Company LLC, Hopkinton, MA (US)

(72) Inventors: Dmitry V. Krivenok, St. Petersburg (RU); Wai C. Yim, Merrimack, NH (US)

(73) Assignee: EMC IP Holding Company LLC, Hopkinton, MA (US)

( * ) Notice: Subject to any disclaimer, the term of this patent is extended or adjusted under 35 U.S.C. 154(b) by 219 days.

(21) Appl. No.: 15/391,099

(22) Filed: Dec. 27, 2016

(51) Int. Cl.
*H04L 12/26* (2006.01)
*H04L 29/08* (2006.01)

(52) U.S. Cl.
CPC .......... *H04L 43/10* (2013.01); *H04L 67/1097* (2013.01); *H04L 67/141* (2013.01)

(58) Field of Classification Search
CPC .... H04L 43/10; H04L 67/141; H04L 67/1097
USPC ........................................................ 709/224
See application file for complete search history.

(56) References Cited

U.S. PATENT DOCUMENTS

| | | | | |
|---|---|---|---|---|
| 7,111,189 B1* | 9/2006 | Sicola | ................. | G06F 11/2092 714/15 |
| 7,565,568 B1* | 7/2009 | Kumar | ................. | G06F 11/201 714/11 |
| 2004/0205148 A1* | 10/2004 | Bae | ..................... | G06F 11/2289 709/213 |
| 2004/0243650 A1* | 12/2004 | McCrory | .............. | G06F 9/5061 |
| 2007/0168693 A1* | 7/2007 | Pittman | ............... | G06F 11/2005 714/4.11 |
| 2007/0294563 A1* | 12/2007 | Bose | ................... | G06F 11/2092 714/5.11 |
| 2014/0258608 A1* | 9/2014 | Viswanatha | ........ | G06F 12/0873 711/113 |
| 2014/0317438 A1* | 10/2014 | Ripoll | ................. | G06F 11/2035 714/4.11 |
| 2015/0169233 A1* | 6/2015 | Anderson | ............. | G06F 3/0613 711/173 |
| 2017/0277439 A1* | 9/2017 | Kalman | ................ | G06F 3/0611 |

* cited by examiner

*Primary Examiner* — James E Springer
(74) *Attorney, Agent, or Firm* — Brian J. Colandreo; Mark H. Wittenberger; Holland & Knight LLP

(57) ABSTRACT

A method, computer program product, and computing system for establishing a data communication channel between a first virtual storage appliance and a second virtual storage appliance within a storage system, wherein the data communication channel includes a network-based data communication path. A heartbeat communication channel is established between the first virtual storage appliance and the second virtual storage appliance within the storage system, wherein the heartbeat communication channel includes a network-based heartbeat communication path. A tie breaker node is coupled to the network-based heartbeat communication path to monitor one or more heartbeat signals present on the network-based heartbeat communication path.

13 Claims, 4 Drawing Sheets

STATUS MONITORING SYSTEM AND METHOD

TECHNICAL FIELD

This disclosure relates to status monitoring systems and, more particularly, to status monitoring systems for virtualized storage systems.

BACKGROUND

Storing and safeguarding electronic content is of paramount importance in modern business. Accordingly, various methodologies may be employed to protect and distribute such electronic content. For example, high-availability, virtualized storage systems may be utilized to provide users with access to virtual machines (and associated storage) that may be custom tailored to the needs and desires of the user. Unfortunately and when utilizing such virtualized storage systems; configurations may be inadvertently changed that may results in a loss of communication between virtualized systems.

SUMMARY OF DISCLOSURE

In one implementation, a computer-implemented method is executed on a computing system and includes establishing a data communication channel between a first virtual storage appliance and a second virtual storage appliance within a storage system, wherein the data communication channel includes a network-based data communication path. A heartbeat communication channel is established between the first virtual storage appliance and the second virtual storage appliance within the storage system, wherein the heartbeat communication channel includes a network-based heartbeat communication path. A tie breaker node is coupled to the network-based heartbeat communication path to monitor one or more heartbeat signals present on the network-based heartbeat communication path.

One or more of the following features may be included. A failure of the network-based data communication path may be sensed. The level of communication between the first virtual storage appliance, the second virtual storage appliance, and the tie breaker node may be determined. In response to the level of communication, whether the first virtual storage appliance or the second virtual storage appliance is partitioned with respect to each other and the tie breaker node may be determined. In response to the level of communication, one or more of the first virtual storage appliance and the second virtual storage appliance may be shut down. The heartbeat communication channel may include a storage-based heartbeat communication path. The storage-based heartbeat communication path may be a high-availability, storage-based heartbeat communication path that may include a first storage-based heartbeat communication path and at least a second storage-based heartbeat communication path.

In another implementation, a computer program product resides on a computer readable medium and has a plurality of instructions stored on it. When executed by a processor, the instructions cause the processor to perform operations including establishing a data communication channel between a first virtual storage appliance and a second virtual storage appliance within a storage system, wherein the data communication channel includes a network-based data communication path. A heartbeat communication channel is established between the first virtual storage appliance and the second virtual storage appliance within the storage system, wherein the heartbeat communication channel includes a network-based heartbeat communication path. A tie breaker node is coupled to the network-based heartbeat communication path to monitor one or more heartbeat signals present on the network-based heartbeat communication path.

One or more of the following features may be included. A failure of the network-based data communication path may be sensed. The level of communication between the first virtual storage appliance, the second virtual storage appliance, and the tie breaker node may be determined. In response to the level of communication, whether the first virtual storage appliance or the second virtual storage appliance is partitioned with respect to each other and the tie breaker node may be determined. In response to the level of communication, one or more of the first virtual storage appliance and the second virtual storage appliance may be shut down. The heartbeat communication channel may include a storage-based heartbeat communication path. The storage-based heartbeat communication path may be a high-availability, storage-based heartbeat communication path that may include a first storage-based heartbeat communication path and at least a second storage-based heartbeat communication path.

In another implementation, a computing system includes a processor and a memory system configured to perform operations including establishing a data communication channel between a first virtual storage appliance and a second virtual storage appliance within a storage system, wherein the data communication channel includes a network-based data communication path. A heartbeat communication channel is established between the first virtual storage appliance and the second virtual storage appliance within the storage system, wherein the heartbeat communication channel includes a network-based heartbeat communication path. A tie breaker node is coupled to the network-based heartbeat communication path to monitor one or more heartbeat signals present on the network-based heartbeat communication path.

One or more of the following features may be included. A failure of the network-based data communication path may be sensed. The level of communication between the first virtual storage appliance, the second virtual storage appliance, and the tie breaker node may be determined. In response to the level of communication, whether the first virtual storage appliance or the second virtual storage appliance is partitioned with respect to each other and the tie breaker node may be determined. In response to the level of communication, one or more of the first virtual storage appliance and the second virtual storage appliance may be shut down. The heartbeat communication channel may include a storage-based heartbeat communication path. The storage-based heartbeat communication path may be a high-availability, storage-based heartbeat communication path that may include a first storage-based heartbeat communication path and at least a second storage-based heartbeat communication path.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
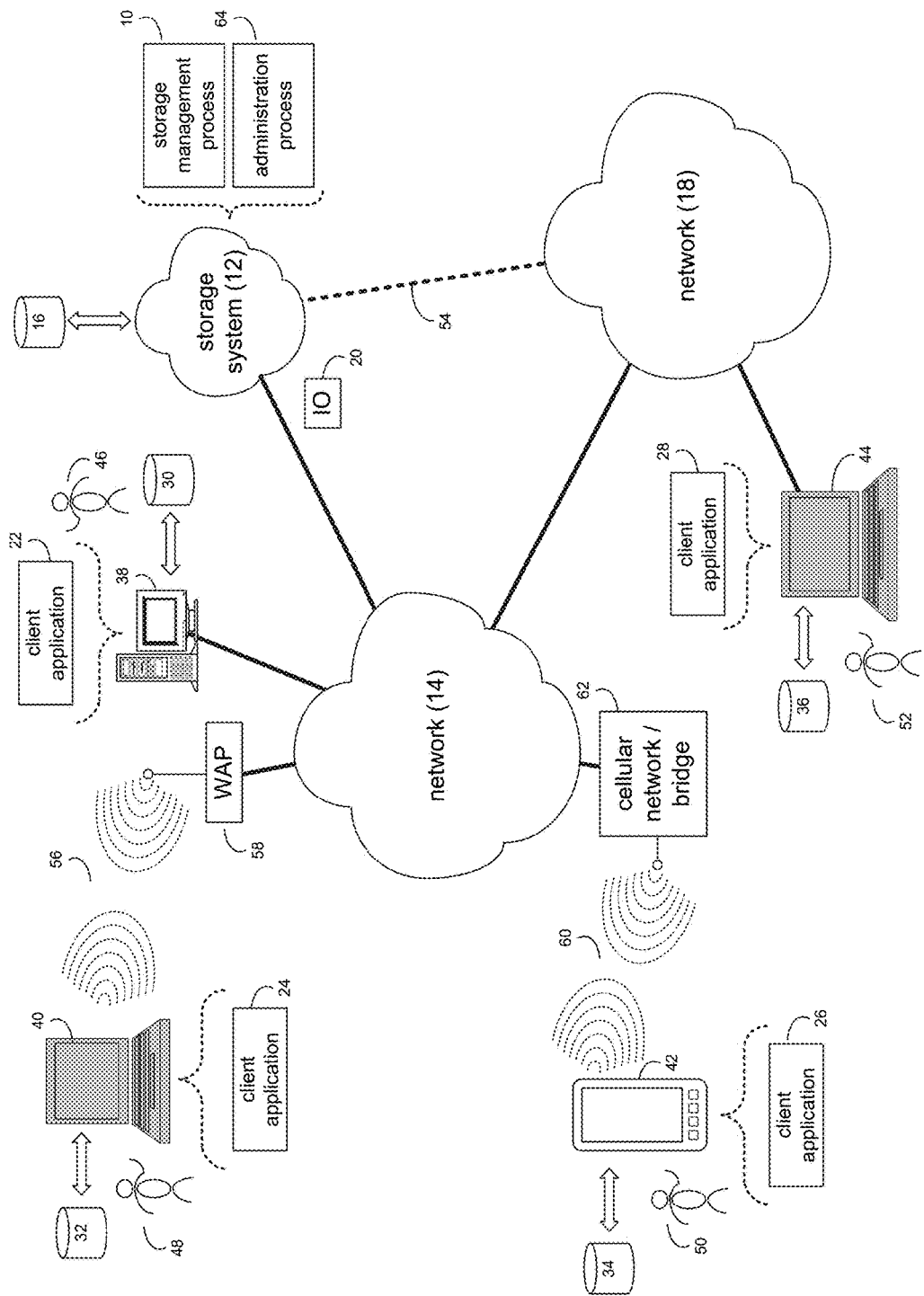
FIG. 1 is a diagrammatic view of a storage system, a status monitoring process and a storage management process coupled to a distributed computing network.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows Server™; Redhat Linux™, Unix, or a custom operating system, for example.

The instruction sets and subroutines of storage management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices (e.g., client electronic devices 38, 40, 42, 44) may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

For illustrative purposes, storage system 12 will be described as being a network-based storage system that includes a plurality of backend storage devices. However, this is for illustrative purposes only and is not intended to be a limitation of this disclosure, as other configurations are possible and are considered to be within the scope of this disclosure.

Figure 2:
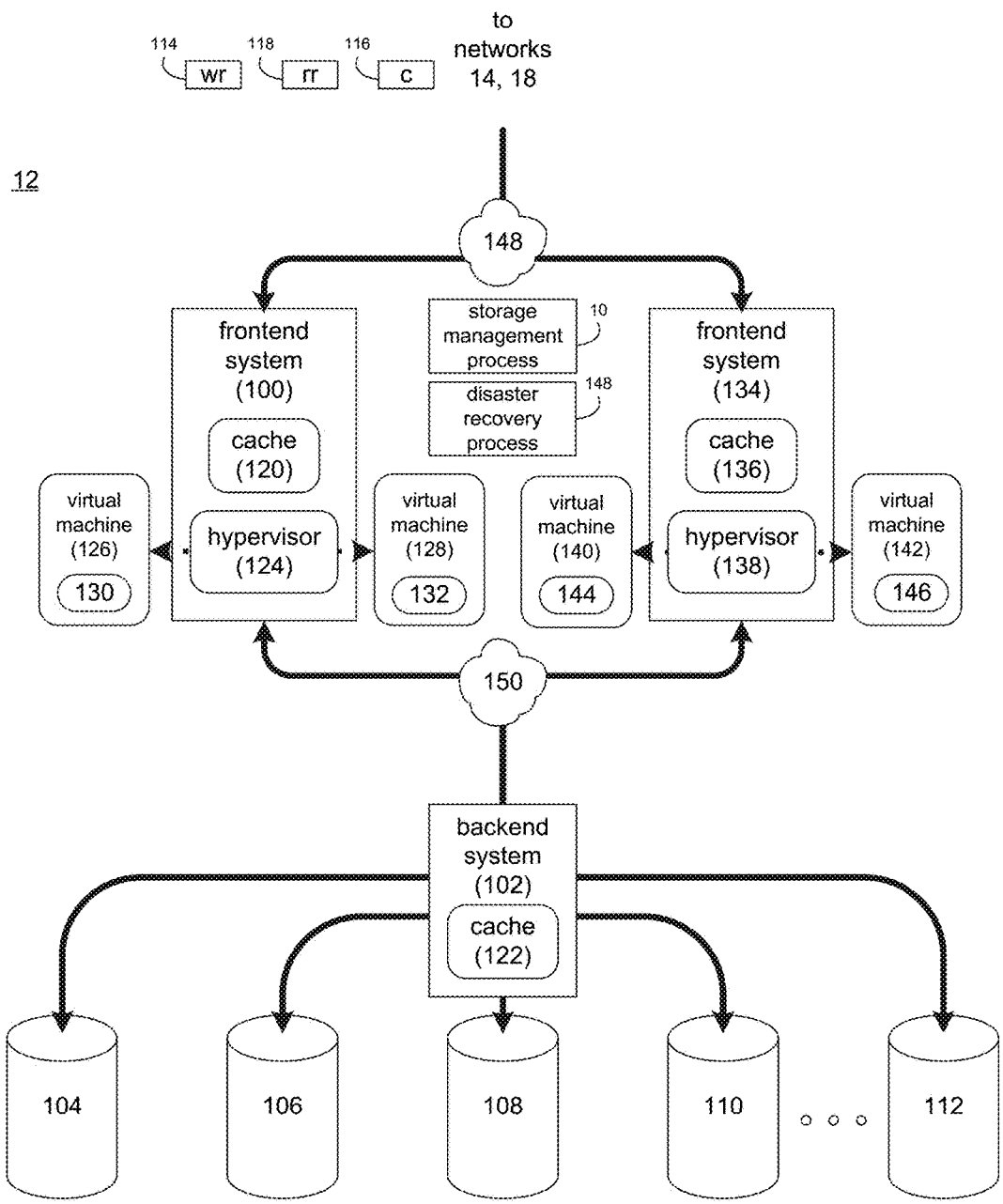
FIG. 2 is a diagrammatic view of the storage system of FIG. 1.

Storage System:

Referring also to FIG. 2, there is shown a general and illustrative implementation of storage system 12 (or a portion thereof). In this general and illustrative implementation, data storage system 12 may include frontend system 100, backend system 102 and a plurality of storage targets (e.g. storage targets 104, 106, 108, 110, 112). Storage targets 104, 106, 108, 110, 112 may be configured to provide various levels of performance and/or high availability. For example, one or more of storage targets 104, 106, 108, 110, 112 may be configured as a RAID 0 array, in which data is striped across storage targets. By striping data across a plurality of storage targets, improved performance may be realized. However, RAID 0 arrays do not provide a level of high availability. Accordingly, one or more of storage targets 104, 106, 108, 110, 112 may be configured as a RAID 1 array, in which data is mirrored between storage targets. By mirroring data between storage targets, a level of high availability is achieved as multiple copies of the data are stored within storage system 12.

While storage targets 104, 106, 108, 110, 112 are discussed above as being configured in a RAID 0 or RAID 1 array, this is for illustrative purposes only and is not intended to be a limitation of this disclosure, as other configurations are possible. For example, storage targets 104, 106, 108, 110, 112 may be configured as a RAID 3, RAID 4, RAID 5, RAID 6 or RAID 7 array. Additionally, storage targets 104, 106, 108, 110, 112 need not be limited to any type of RAID systems, as other configurations are possible and are considered to be within the scope of this disclosure. For example, storage targets 104, 106, 108, 110, 112 may be configured as e.g., scale-out SANs (such as VMWare vSAN™ and Dell EMC Scale IO™).

While in this particular example, storage system 12 is shown to include five storage targets (e.g. storage targets 104, 106, 108, 110, 112), this is for illustrative purposes only and is not intended to be a limitation of this disclosure. Specifically, the actual number of storage targets may be increased or decreased depending upon e.g. the level of redundancy/performance/capacity required.

One or more of storage targets 104, 106, 108, 110, 112 may be configured to store coded data, wherein such coded data may allow for the regeneration of data lost/corrupted on one or more of storage targets 104, 106, 108, 110, 112. Examples of such coded data may include but is not limited to parity data and Reed-Solomon data. Such coded data may be distributed across all of storage targets 104, 106, 108, 110, 112 or may be stored within a specific storage device. Examples of storage targets 104, 106, 108, 110, 112 may include one or more electro-mechanical hard disk drives and/or solid-state/flash devices.

Storage system 12 may execute all or a portion of storage management process 10. The instruction sets and subroutines of storage management process 10, which may be stored on a storage device (e.g., storage device 16) coupled to frontend system 100 and/or backend system 102, may be executed by one or more processors (not shown) and one or more memory architectures (not shown) included within frontend system 100 and/or backend system 102. Storage device 16 may include but is not limited to: a hard disk drive; a RAID device; random access memory (RAM); read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when frontend system 100 is configured as an application server, these IO requests may be internally generated within frontend system 100. Examples of IO request 20 may include but are not limited to data write request 114 (i.e. a request that content 116 be written to storage system 12) and data read request 118 (i.e. a request that content 116 be read from storage system 12).

During operation of frontend system 100, content 116 to be written to storage system 12 may be processed by frontend system 100. Additionally/alternatively and when frontend system 100 is configured as an application server, content 116 to be written to storage system 12 may be internally generated by frontend system 100.

Frontend system 100 may include frontend cache memory system 120. Examples of frontend cache memory system 120 may include but are not limited to a volatile, solid-state, cache memory system (e.g., a dynamic RAM cache memory system) and/or a non-volatile, solid-state, cache memory system (e.g., a flash-based, cache memory system).

Frontend system 100 may initially store content 116 within frontend cache memory system 120. Depending upon the manner in which frontend cache memory system 120 is configured, frontend system 100 may immediately provide content 116 to backend system 102 (if frontend cache memory system 120 is configured as a write-through cache) or may subsequently provide content 116 to backend system 102 (if frontend cache memory system 120 is configured as a write-back cache).

Backend system 102 may include backend cache memory system 122. Examples of backend cache memory system 122 may include but are not limited to a volatile, solid-state, cache memory system (e.g., a dynamic RAM cache memory system) and/or a non-volatile, solid-state, cache memory system (e.g., a flash-based, cache memory system). During operation of backend system 102, content 116 to be written to storage targets 104, 106, 108, 110, 112 may be received from frontend system 100. Backend system 112 may initially store content 116 within backend cache memory system 122 prior to being stored on e.g. one or more of storage targets 104, 106, 108, 110, 112.

Frontend system 100 may include and/or execute a hypervisor (e.g., hypervisor 124) that may allow for the execution of one or more virtual machines (e.g., virtual machines 126, 128). As is known in the art, a hypervisor (e.g., hypervisor 124) is a piece of computer software, firmware and/or hardware that creates and runs virtual machines (e.g., virtual machines 126, 128), wherein the hypervisor (e.g., hypervisor 124) may present and manage a guest operating system on a virtual operating platform. Therefore, multiple instantiations of a variety of operating systems may be effectuated on shared hardware resources. For example, Linux™, Windows™, and Mac™ operating system instantiations may all run on a single physical x86 system.

Accordingly, virtual machines 126, 128 may be emulations of a physical computer system. For example, virtual machine 126 may be configured to provide the functionality of a Windows™ based computing system and may allow for the execution of Windows-based application 130, while virtual machine 128 may be configured to provide the functionality of a Linux™ based computing system and may allow for the execution of Linux-based application 132.

Frontend system 100 and/or backend system 102 may include one or more physical hardware components (not shown) that may be configurable by hypervisor 124 to form virtual machines (e.g., virtual machines 126, 128). Examples of these physical hardware components may include but are not limited to: hard drives (e.g., storage targets 104, 106, 108, 110, 112), RAID arrays (e.g., formed by storage targets 104, 106, 108, 110, 112), host bus adapters, network controllers, network systems and components, processor cores, cache memory architectures (e.g., frontend cache memory system 120 and/or backend cache memory system 122), volatile memory architectures, and persistent memory architectures. Accordingly and when virtual machine 126 and/or virtual machine 128 are executed on hypervisor 124, various portions of these physical hardware components may be assigned to/mapped to virtual machine 126 and/or virtual machine 128.

In order to provide a higher-level of availability and/or a higher level of performance, storage system 12 may include one or more additional frontend systems (e.g., frontend system 134) that may be configured in a manner similar to frontend system 100. Therefore, frontend system 134 may include a frontend cache system (e.g., frontend cache 136) and may include and/or execute a hypervisor (e.g., hypervisor 138) that may allow for the execution of one or more virtual machines (e.g., virtual machines 140, 142), which may run applications (e.g., applications 144, 146).

The various components of storage system 12 may be interconnected with (and may communicate through) one or more communication networks (e.g., networks 148, 150).

Status Monitoring Process:

As will be discussed below in greater detail, status monitoring process 148 may be configured to allow for the monitoring of one or more virtual components deployed within storage system 12. The instruction sets and subroutines of status monitoring process 148, which may be stored on a storage device (e.g., storage device 16) coupled to frontend system 100, frontend system 134 and/or backend system 102, may be executed by one or more processors (not shown) and one or more memory architectures (not shown) included within frontend system 100, frontend system 134 and/or backend system 102.

Figure 3:
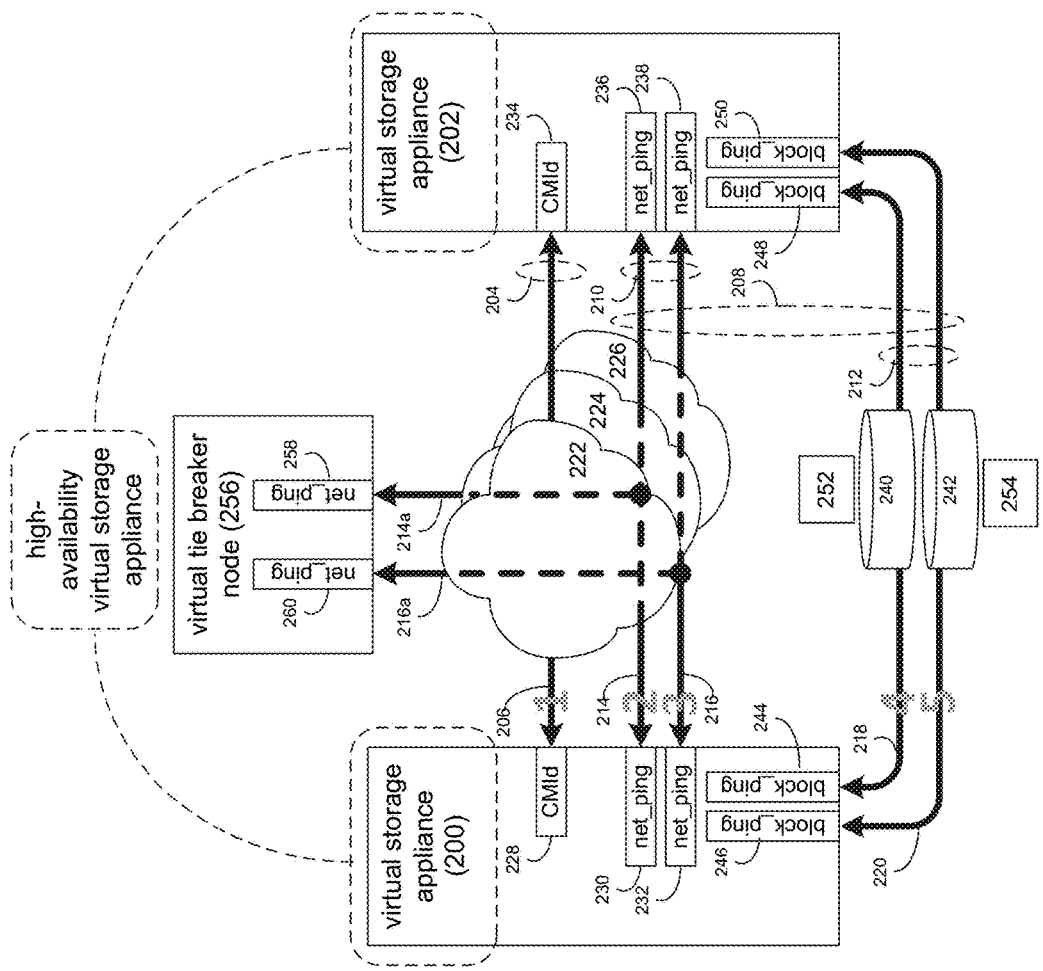
FIG. 3 is virtualized view of the storage system of FIG. 1.

Referring also to FIG. 3, there is shown one example of the manner in which virtualized components may be deployed within storage system 12. As discussed above, the various hypervisors (e.g., hypervisor 124 and hypervisor 138) may allow for the execution of virtual machines (e.g., virtual machines 126, 128 via hypervisor 124 and virtual machines 140, 142 via hypervisor 138), wherein these virtual machines may allow for the execution of various applications (e.g., applications 130, 132 and applications 144, 146).

One example of such virtualized components deployed within storage system 12 may include but is not limited to virtual storage appliances (VSAs). For example, a first virtual storage appliance (e.g., VSA 200) and a second virtual storage appliance (e.g., VSA 202) may be deployed within storage system 12 and may be generated based upon the physical hardware of storage system 12 (in the manner described above). For high availability purposes, VSA 200 may be executed on frontend system 100, while VSA 202 may be executed on frontend system 134, wherein the combination of VSA 200 and VSA 202 may form a high-availability virtual storage appliance.

Further and in this example, VSA 200 (which is e.g., based upon the hardware/resources of frontend system 100) and VSA 202 (which is e.g., based upon the hardware/resources of frontend system 134) may be configured in a manner that allows VSA 200 and VSA 202 to each access storage targets 104, 106, 108, 110, 112. For example, one or more logical storage devices (e.g., LUNs) may be formed from the one or more physical storage devices (e.g., storage targets 104, 106, 108, 110, 112), wherein VSA 200 and VSA 202 may work cooperatively (e.g., in an active-active or active-passive fashion) so that they both may access these logical storage devices.

In order to enable VSA 200 and VSA 202 to work cooperatively and coordinate access to the logical storage devices (e.g., LUNs) formed from storage targets 104, 106, 108, 110, 112, VSA 200 and VSA 202 may communicate with each other to avoid a "split-brain" situation, wherein each of VSA 200 and VSA 202 is writing data to these logical storage devices without regard for what the other is doing (which may result in data loss and/or data corruption).

Figure 4:
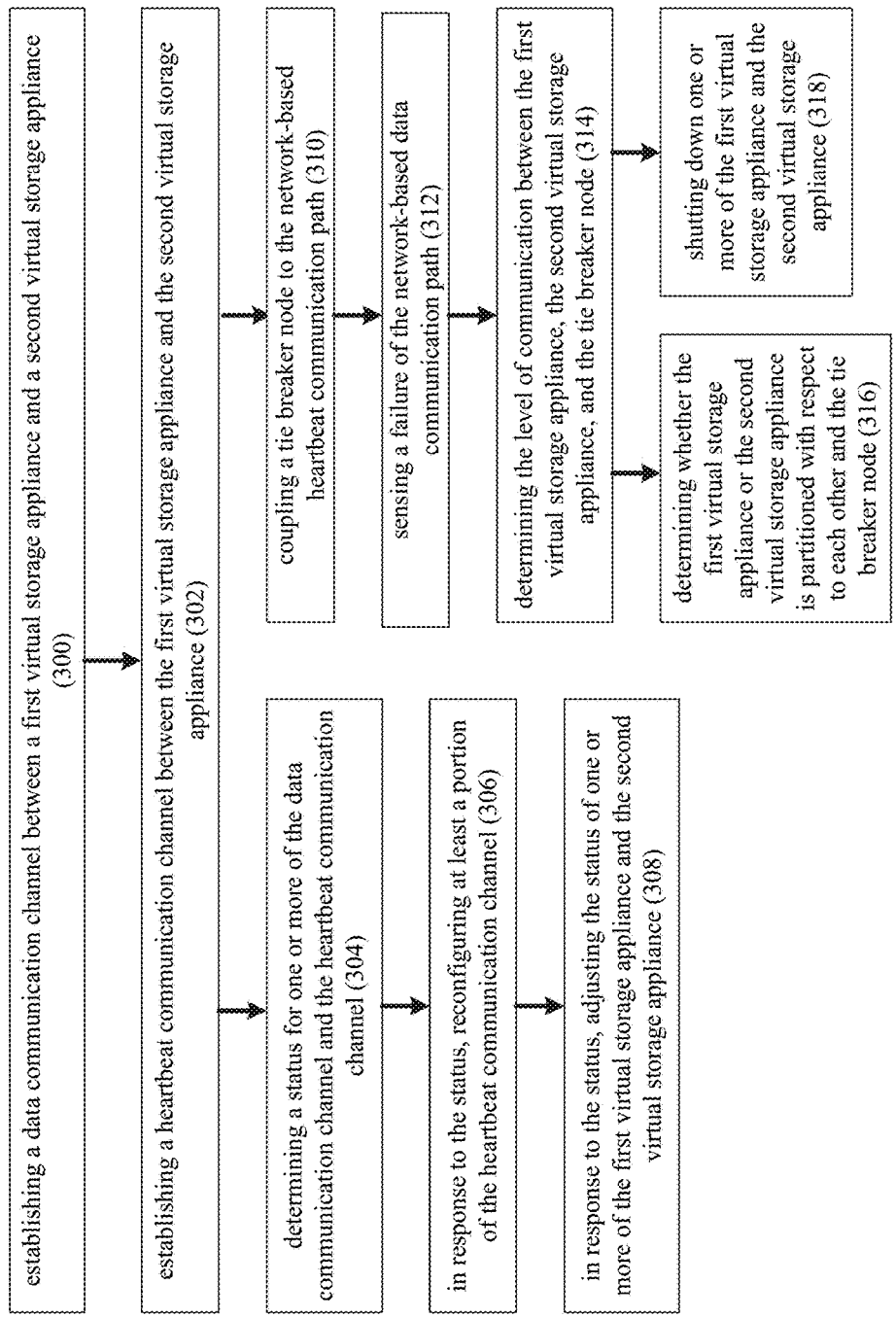
FIG. 4 is a flow chart of the status monitoring process of FIG. 1.

Additionally and to further enhance the level of high availability, VSA 200 and VSA 202 may be coupled to (i.e., communicate with) each other using a plurality of different communication paths. For example and referring also to FIG. 4, status monitoring process 148 may establish 300 a data communication channel (e.g., data communication channel 204) between a first virtual storage appliance (e.g., VSA 200) and a second virtual storage appliance (e.g., VSA 200) within storage system 12, wherein data communication channel 204 may include network-based data communication path 206.

Status monitoring process 148 may also establish 302 a heartbeat communication channel (e.g., heartbeat communication channel 208) between the first virtual storage appliance (e.g., VSA 200) and the second virtual storage appliance (e.g., VSA 202) within storage system 12. Heartbeat communication channel 208 may include at least one network-based heartbeat communication path 210 and/or at least one storage-based heartbeat communication path 212.

For example, network-based heartbeat communication path 210 may be a high-availability, network-based heartbeat communication path that includes first network-based heartbeat communication path 214 and at least a second network-based heartbeat communication path 216. Further, storage-based heartbeat communication path 212 may be a high-availability, storage-based heartbeat communication path that includes first storage-based heartbeat communication path 218 and at least a second storage-based heartbeat communication path 220.

Accordingly and in this particular example, five communication paths are established between VSA 200 and VSA 202 to provide a high level of availability, namely: 1st communication path 206, 2nd communication path 214, 3rd communication path 216, 4th communication path 218, and 5th communication path 220.

Communication paths 206, 214, 216 may all be network-based communication paths and may allow VSA 200 and VSA 202 to communicate via one or more virtualized data communication networks (e.g., virtualized communication networks 222, 224, 226), an example of which may include but is not limited to a virtualized IP communications network.

In the interest of providing a high level of availability, each of virtualized communication networks 222, 224, 226 may be mapped to/upon a separate and distinct underlying hardware-based communications network. For example, first virtualized communication network 222 may be mapped upon e.g., a first set of hardware switches and hardware routers within e.g., one or more of networks 148, 150 (of FIG. 2); second virtualized communication network 224 may be mapped upon e.g., a second set of hardware switches and hardware routers within e.g., one or more of networks 148, 150 (of FIG. 2); and third virtualized communication network 226 may be mapped upon e.g., a third set of hardware switches and hardware routers within e.g., one or more of networks 148, 150 (of FIG. 2).

Additionally and in the interest of providing a high level of availability, each of communication paths 206, 214, 216 may be coupled to VSA 200 and VSA 202 using a virtualized connection that may be mapped to/upon separate and distinct underlying network hardware.

For example, connection 228 between VSA 200 and communication path 206 may be mapped onto a first network interface adapter within e.g., frontend system 100; connection 230 between VSA 200 and communication path 214 may be mapped onto a second network interface adapter within e.g., frontend system 100; and connection 232 between VSA 200 and communication path 216 may be mapped onto a third network interface adapter within e.g., frontend system 100.

Further, connection 234 between VSA 202 and communication path 206 may be mapped onto a first network interface adapter within e.g., frontend system 134; connection 236 between VSA 202 and communication path 214 may be mapped onto a second network interface adapter within e.g., frontend system 134; and connection 238 between VSA 202 and communication path 216 may be mapped onto a third network interface adapter within e.g., frontend system 134.

Communication path 206 may be configured to allow VSA 200 and VSA 202 to communicate by routinely transferring data/messages between VSA 200 and VSA 202. Accordingly, in the event that one VSA does not receive a message from the other VSA for a defined period of time, that other VSA may be deemed to be offline/unavailable.

Communication via communication path 206 may be effectuated via e.g., a CMI protocol and CMI driver (e.g., CMId), such as a Common Messaging Interface developed by Dell EMC of Hopkinton, Mass.

Communication paths 214, 216 may be configured to allow VSA 200 and VSA 202 to communicate by repeatedly providing heartbeat signals to each other to indicate their continued operation. Accordingly, in the event that one VSA does not receive a heartbeat signal from the other VSA for a defined period of time, that other VSA may be deemed to be offline/unavailable.

Communication via communication paths 214, 216 may be effectuated via e.g., an HB protocol and HB driver (e.g., net ping), which is a heartbeat protocol developed by Dell EMC of Hopkinton, Mass.

Communication paths 218, 220 may both be storage-based communication paths and may allow VSA 200 and VSA 202 to communicate via one or more virtualized storage devices (e.g., virtualized storage device 240 for communication path 218 and virtualized storage device 242 for communication path 220, an example of which includes a LUN (i.e., logical storage device) formed from one or more physical storage devices (e.g., storage targets 104, 106, 108, 110, 112).

Additionally and in the interest of providing a high level of availability, each of communication paths 218, 220 may be coupled to VSA 200 and VSA 202 using a virtualized connection that may be mapped to/upon separate and distinct underlying network hardware.

For example, connection 244 between VSA 200 and communication path 218 may be mapped onto a fourth network interface adapter within e.g., frontend system 100; and connection 246 between VSA 200 and communication path 220 may be mapped onto a fifth network interface adapter within e.g., frontend system 100. Further, connection 248 between VSA 202 and communication path 218 may be mapped onto a fourth network interface adapter within e.g., frontend system 134; and connection 250 between VSA 202 and communication path 220 may be mapped onto a fifth network interface adapter within e.g., frontend system 134.

Communication paths 218, 220 may be configured to allow VSA 200 and VSA 202 to communicate by providing heartbeat signals that indicate their continued operation and are written to e.g., a defined storage space within virtualized storage device 240 and virtualized storage device 242. For example, each of VSA 200 and VSA 202 may provide heartbeat signals via communication path 218 to virtualized storage device 240, wherein these heartbeat signals may be written to defined storage space 252 using e.g., sector size IO to virtualized storage device 240 (or a partition thereof). Further, each of VSA 200 and VSA 202 may provide heartbeat signals via communication path 220 to virtualized storage device 242, wherein these heartbeat signals may be written to defined storage space 254 using e.g., sector size IO to virtualized storage device 242 (or a partition thereof).

For example and concerning communication path 218, VSA 200 may write its heartbeat signal to defined storage space 252 and read the last defined storage space entry written by VSA 202, wherein VSA 202 may write its heartbeat signal to defined storage space 252 and read the last defined storage space entry written by VSA 200. These entries into defined storage space 252 may include a status indicator and incrementing counter, wherein each entry is assigned a unique incremented value. Accordingly, if the incremented value of the last heartbeat signal entry of a particular VSA is too old/has expired, that VSA may be deemed to be offline/unavailable. For example, if the incremented value of the last heartbeat signal entry of a particular VSA has not changed for a defined number of read operations, that VSA may be deemed as not being visible.

Communication via communication paths 218, 220 may be effectuated via e.g., an HB protocol and HB driver (e.g., block_ping), which is a heartbeat protocol developed by Dell EMC of Hopkinton, Mass.

Status monitoring process 148 may determine 304 a status for one or more of data communication channel 204 and heartbeat communication channel 208. For example, status monitoring process 148 may determine 304 the status of network communication paths 206, 214, 216 between VSA 200 and VSA 202. Further, status monitoring process 148 may determine 304 the status of network communication paths 218, 220 between VSA 200 and VSA 202 (via virtualized storage devices 240, 242, respectfully). In response to the above-determined statuses, status monitoring process 148 may reconfigure 306 at least a portion of heartbeat communication channel 208 and/or may adjust 308 the status of VSA 200 and/or VSA 202.

As discussed above, communication paths 206, 214, 216, 218, 220 may be configured to provide a high level of availability with respect to VSA 200 and VSA 202 and may enable VSA 200 and VSA 202 to work cooperatively and coordinate access to the logical storage devices (e.g., LUNs) formed from storage targets 104, 106, 108, 110, 112. Accordingly and as will be discussed below, the manner in which status monitoring process 148 reconfigures 306 at least a portion of heartbeat communication channel 208 and/or adjusts 308 the status of VSA 200 and/or VSA 202 may vary.

Assume for this first example, that instead of having five communication paths, there are only three (namely communication paths 206, 214, 216). Therefore and for this example, heartbeat communication channel 208 includes only two communication paths (e.g., network-based heartbeat communication paths 214, 216). Accordingly, status monitoring process 148 may determine 304 a status for network-based data communication path 206 and network-based heartbeat communication paths 214, 216.

In the event that status monitoring process 148 determines 304 that:

network-based data communication path 206 is not working, network-based heartbeat communication path 214 is working, and network-based heartbeat communication path 216 is working;

status monitoring process 148 may adjust 308 the status of VSA 200 and/or VSA 202 by e.g., shutting down VSA 200 and continuing to operate VSA 202 normally (as VSA 202 is still visible via network-based heartbeat communication paths 214, 216.

In the event that status monitoring process 148 determines 304 that:

network-based data communication path 206 is not working, network-based heartbeat communication path 214 is not working, and network-based heartbeat communication path 216 is working;

status monitoring process 148 may adjust 308 the status of VSA 200 and/or VSA 202 by e.g., shutting down VSA 200 and continuing to operate VSA 202 normally (as VSA 202 is still visible via network-based heartbeat communication paths 216.

In the event that status monitoring process 148 determines 304 that:

network-based data communication path 206 is not working, network-based heartbeat communication path 214 is not working, and network-based heartbeat communication path 216 is not working;

status monitoring process 148 may reconfigure 306 at least a portion of heartbeat communication channel 208 by e.g., activating storage-based heartbeat communication paths 218, 220.

Accordingly and continuing with the above-stated example, there are now five communication paths, namely communication paths 206, 214, 216, 218, 220. Therefore, status monitoring process 148 may determine 304 a status for network-based data communication path 206, network-based heartbeat communication paths 214, 216, and storage-based heartbeat communication paths 218, 220.

In the event that status monitoring process 148 determines 304 that:

network-based data communication path 206 is not working, network-based heartbeat communication path 214 is not working, network-based heartbeat communication path 216 is not working, storage-based heartbeat communication path 218 is working, and storage-based heartbeat communication path 220 is working.

status monitoring process 148 may adjust 308 the status of VSA 200 and/or VSA 202 by e.g., shutting down VSA 200 and continuing to operate VSA 202 normally (as VSA 202 is still visible via storage-based heartbeat communication paths 218, 220.

In the event that status monitoring process 148 determines 304 that:

network-based data communication path 206 is not working, network-based heartbeat communication path 214 is not working, network-based heartbeat communication path 216 is not working, storage-based heartbeat communication path 218 is not working, and storage-based heartbeat communication path 220 is working.

status monitoring process 148 may adjust 308 the status of VSA 200 and/or VSA 202 by e.g., shutting down VSA 200 and continuing to operate VSA 202 normally (as VSA 202 is still visible via storage-based heartbeat communication path 220.

In the event that status monitoring process 148 determines 304 that:

network-based data communication path 206 is not working, network-based heartbeat communication path 214 is not working, network-based heartbeat communication path 216 is not working, storage-based heartbeat communication path 218 is not working, and storage-based heartbeat communication path 220 is not working.

each of VSA 200 and VSA 202 may think that they are the only VSA (since all communication has been lost between VSA 200 and VSA 202). Therefore, status monitoring process 148 may determine that a "split-brain" situation exists. Unfortunately and in such a situation, the resolving of this "split-brain" condition may require the utilization of one or more additional virtual components.

Tie Breaker Node:

In the last scenario defined above, all communication is lost between VSA 200 and VSA 202. According and in such a situation, it is difficult to determine the status of VSA 200 and VSA 202. Accordingly, remedial action may need to be taken in order to avoid the "split-brain" situation discussed above.

Unfortunately, and with the configuration defined above, it is difficult if not impossible to tell which of the two VSAs actually partitioned itself (e.g., segregated itself or separated itself) from the rest of the network. Accordingly, rules may be defined so that when communication is lost between VSAs, a default action requires a specific VSA to be shut down. And in the scenarios defined above, the default sVA to be shutdown was VSA 200.

However, an additional virtual component, such as a tie breaker node (e.g., TBN 256), may be added to the network and may run on top of/be mapped to the hardware of storage system 12, such as the hardware of VSA 200, the hardware of VSA 202 and/or the hardware of another VSA (not shown). Fortunately, this additional virtual component (e.g., TBN 256) may provide additional insight concerning the reason for the lack of communication between (in this example) VSA 200 and VSA 202.

Status monitoring process 148 may couple 310 a tie breaker node (e.g., TBN 256) to network-based heartbeat communication path 210 so that the heartbeat signal(s) present on network-based heartbeat communication path 210 may be monitored by TBN 256. As discussed above, network-based heartbeat communication path 210 may be a high-availability, network-based heartbeat communication path that includes first network-based heartbeat communication path 214 and at least a second network-based heartbeat communication path 216.

Accordingly and when coupling 310 TBN 256 to network-based heartbeat communication path 210, status monitoring process 148 may couple TBN 256 to both network-based heartbeat communication path 214 (via connection 214a) and network-based heartbeat communication path 216 (via connection 216a) included within high-availability, network-based heartbeat communication path 210. Accordingly, TBN 256 may be coupled to each of the discrete network-based heartbeat communication paths that couple VSA 200 and VSA 202. So if a third network-based heartbeat communication path coupled VSA 200 and VSA 202, status monitoring process 148 would also couple TBN 256 to that third network-based heartbeat communication path.

In the interest of providing a high level of availability, each of connections 214a, 216a may be coupled to TBN 256 using a virtualized connection that may be mapped to/upon separate and distinct underlying network hardware. For example, connection 258 between TBN 256 and connection 214a may be mapped onto a first network interface adapter within e.g., TBN 256; and connection 260 between TBN 256 and connection 216a may be mapped onto a second network interface adapter within e.g., TBN 256. Communication between communication paths 214, 216 and connections 214a, 216a may be effectuated via e.g., an HB protocol and HB driver (e.g., net ping), which is a heartbeat protocol developed by Dell EMC of Hopkinton, Mass.

For the following example, assume that status monitoring process 148 senses 312 that network-based data communication path 206 has failed. In response to sensing 312 such a failure, status monitoring process 148 may determine 314 the level of communication between VSA 200, VSA 202, and tie breaker node 256 and may determine 316 if VSA 200 or VSA 202 is partitioned with respect to each other and tie breaker node 256. As will be explained below, once the level of communication is determined 314, status monitoring process 148 may shut down 318 one or more of VSA 200 and VSA 202. The table embedded below defines how status monitoring process 148 may react to various communication scenarios that are identified once the various levels of communications are determined 314.

For example, the first column of the embedded table defines whether VSA 200 and VSA 202 can communicate with each other; the second column of the embedded table defines whether VSA 200 and TBN 256 can communicate with each other; the third column of the embedded table defines whether VSA 202 and TBN 256 can communicate with each other; and the fourth column of the embedded table defines the action that status monitoring process 142 may take in response to such communication scenarios.

| VSA 200-VSA 202 | VSA 200-TBN 256 | VSA 202-TBN 256 | Action |
|---|---|---|---|
| Yes | Yes | Yes | VSA 200 is shutdown (2 v. 2) |
| Yes | No | No | VSA 200 is shutdown (1 v. 1) |
| Yes | Yes | No | VSA 202 is shutdown (1 v. 2) |
| Yes | No | Yes | VSA 200 is shutdown (1 v. 2) |
| No | Yes | Yes | VSA 200 is shutdown (2 v. 2) |
| No | No | No | VSA 200 & VSA 202 are shutdown |
| No | Yes | No | VSA 202 is shutdown (1 v. 2) |
| No | No | Yes | VSA 200 is shutdown (1 v. 2) |

ROW 1: As VSA 200, VSA 202 and TBN 256 can all see each other, none of the devices seem to be partitioned with respect to the other devices. Accordingly, status monitoring process 148 may apply the above-described default rule and may shutdown 318 VSA 200.

ROW 2: While VSA 200 and VSA 202 can see each other, TBN 256 cannot see VSA 200 and cannot see VSA 202. Therefore, either VSA 200 or VSA 202 may be partitioned with respect to the other devices. Accordingly, status monitoring process 148 may apply the above-described default rule and may shutdown 318 VSA 200.

ROW 3: While VSA 200 and VSA 202 can see each other, TBN 256 can see VSA 200 but cannot see VSA 202. Therefore, VSA 202 may be partitioned with respect to the other devices. Accordingly, status monitoring process 148 may shutdown 318 VSA 202.

ROW 4: While VSA 200 and VSA 202 can see each other, TBN 256 cannot see VSA 200 but can see VSA 202. Therefore, VSA 200 may be partitioned with respect to the other devices. Accordingly, status monitoring process 148 may shutdown 318 VSA 200.

ROW 5 While VSA 200 and VSA 202 cannot see each other, TBN 256 can see VSA 200 and can see VSA 202. Therefore, either VSA 200 or VSA 202 may be partitioned with respect to the other devices. Accordingly, status monitoring process 148 may apply the above-described default rule and may shutdown 318 VSA 200.

ROW 6: As none of VSA 200, VSA 202 and TBN 256 can see each other, status monitoring process 148 may shutdown 318 both VSA 200 and VSA 202, which will result in data unavailability but will eliminate the chance of the "split-brain" situation described above.

ROW 7 While VSA 200 and VSA 202 cannot see each other, TBN 256 can see VSA 200 but cannot see VSA 202. Therefore, VSA 202 may be partitioned with respect to the other devices. Accordingly, status monitoring process 148 may shutdown 318 VSA 202.

ROW 8 While VSA 200 and VSA 202 cannot see each other, TBN 256 cannot see VSA 200 but can see VSA 202. Therefore, VSA 200 may be partitioned with respect to the other devices. Accordingly, status monitoring process 148 may shutdown 318 VSA 200.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing system, comprising:
    establishing a data communication channel between a first virtual storage appliance and a second virtual storage appliance within a storage system, wherein the data communication channel includes a network-based data communication path;
    establishing a heartbeat communication channel between the first virtual storage appliance and the second virtual storage appliance within the storage system, wherein the heartbeat communication channel includes a network-based heartbeat communication path;
    coupling a tie breaker node to the network-based heartbeat communication path to monitor one or more heartbeat signals present on the network-based heartbeat communication path;
    sensing a failure of the network-based data communication path; and
    determining a level of communication between the first virtual storage appliance, the second virtual storage appliance, and the tie breaker node, wherein, in response to the level of communication, determining whether the first virtual storage appliance or the second virtual storage appliance is partitioned with respect to each other and the tie breaker node.

2. The computer-implemented method of claim 1 further comprising:
    in response to the level of communication, shutting down one or more of the first virtual storage appliance and the second virtual storage appliance.

3. The computer-implemented method of claim 1 wherein the heartbeat communication channel includes a storage-based heartbeat communication path.

4. The computer-implemented method of claim 3 wherein the storage-based heartbeat communication path is a high-availability, storage-based heartbeat communication path that includes a first storage-based heartbeat communication path and at least a second storage-based heartbeat communication path.

5. A computer program product residing on a non-transitory computer readable medium having a plurality of instructions stored thereon which, when executed by a processor, cause the processor to perform operations comprising:
    establishing a data communication channel between a first virtual storage appliance and a second virtual storage appliance within a storage system, wherein the data communication channel includes a network-based data communication path;

establishing a heartbeat communication channel between the first virtual storage appliance and the second virtual storage appliance within the storage system, wherein the heartbeat communication channel includes a network-based heartbeat communication path;

coupling a tie breaker node to the network-based heartbeat communication path to monitor one or more heartbeat signals present on the network-based heartbeat communication path;

sensing a failure of the network-based data communication path; and determining a level of communication between the first virtual storage appliance, the second virtual storage appliance, and the tie breaker node, wherein, in response to the level of communication, determining whether the first virtual storage appliance or the second virtual storage appliance is partitioned with respect to each other and the tie breaker node.

6. The computer program product of claim 5 further comprising:

in response to the level of communication, shutting down one or more of the first virtual storage appliance and the second virtual storage appliance.

7. The computer program product of claim 5 wherein the heartbeat communication channel includes a storage-based heartbeat communication path.

8. The computer program product of claim 7 wherein the storage-based heartbeat communication path is a high-availability, storage-based heartbeat communication path that includes a first storage-based heartbeat communication path and at least a second storage-based heartbeat communication path.

9. A computing system including a processor and memory configured to perform operations comprising:

establishing a data communication channel between a first virtual storage appliance and a second virtual storage appliance within a storage system, wherein the data communication channel includes a network-based data communication path;

establishing a heartbeat communication channel between the first virtual storage appliance and the second virtual storage appliance within the storage system, wherein the heartbeat communication channel includes a network-based heartbeat communication path;

coupling a tie breaker node to the network-based heartbeat communication path to monitor one or more heartbeat signals present on the network-based heartbeat communication path;

sensing a failure of the network-based data communication path; and determining a level of communication between the first virtual storage appliance, the second virtual storage appliance, and the tie breaker node, wherein, in response to the level of communication, determining whether the first virtual storage appliance or the second virtual storage appliance is partitioned with respect to each other and the tie breaker node.

10. The computing system of claim 9 further configured to perform operations comprising:

in response to the level of communication, shutting down one or more of the first virtual storage appliance and the second virtual storage appliance.

11. The computing system of claim 9 wherein the heartbeat communication channel includes a storage-based heartbeat communication path.

12. The computing system of claim 11 wherein the storage-based heartbeat communication path is a high-availability, storage-based heartbeat communication path that includes a first storage-based heartbeat communication path and at least a second storage-based heartbeat communication path.

13. A computer-implemented method, executed on a computing system, comprising:

establishing a data communication channel between a first virtual storage appliance and a second virtual storage appliance within a storage system, wherein the data communication channel includes a network-based data communication path;

establishing a heartbeat communication channel between the first virtual storage appliance and the second virtual storage appliance within the storage system, wherein the heartbeat communication channel includes a network-based heartbeat communication path;

coupling a tie breaker node to the network-based heartbeat communication path to monitor one or more heartbeat signals present on the network-based heartbeat communication path;

sensing a failure of the network-based data communication path; and determining a level of communication between the first virtual storage appliance, the second virtual storage appliance, and the tie breaker node, wherein, in response to the level of communication, shutting down one or more of the first virtual storage appliance and the second virtual storage appliance.

* * * * *